Feb. 6, 1951 D. HARKER 2,540,821
X-RAY SPECTROMETER
Filed April 19, 1949 2 Sheets-Sheet 1
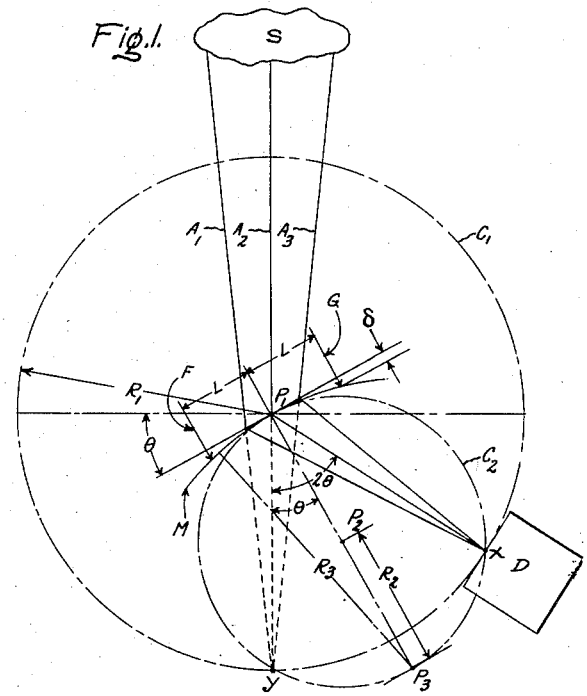
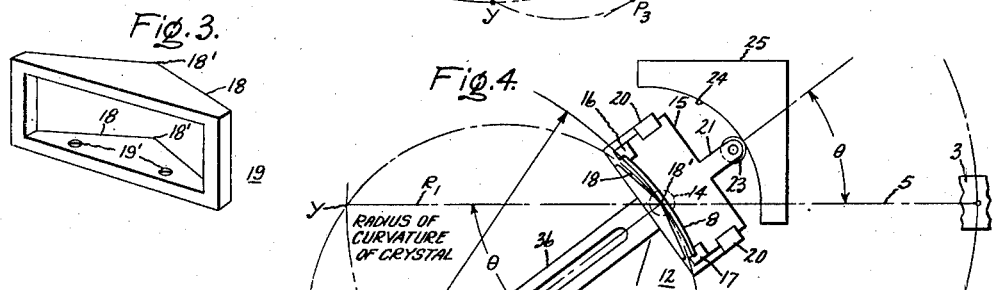
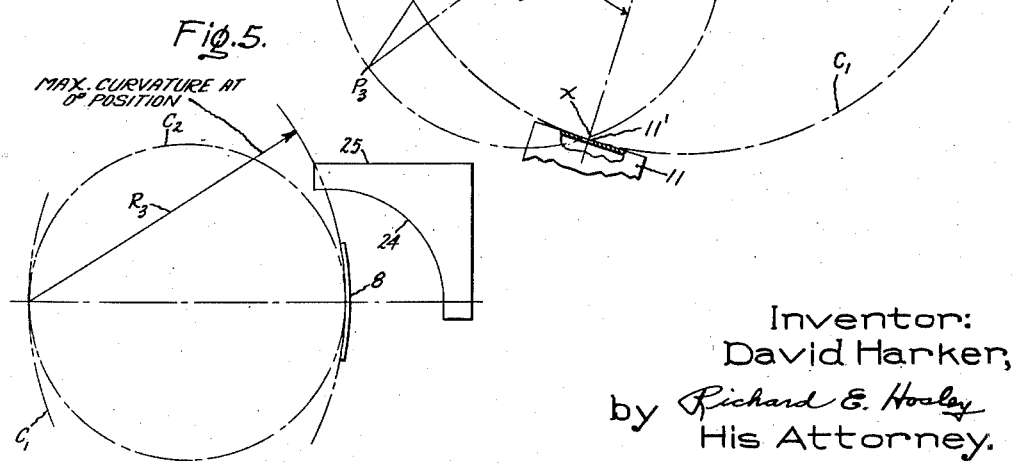
Inventor:
David Harker,
by Richard E. Hooley
His Attorney.

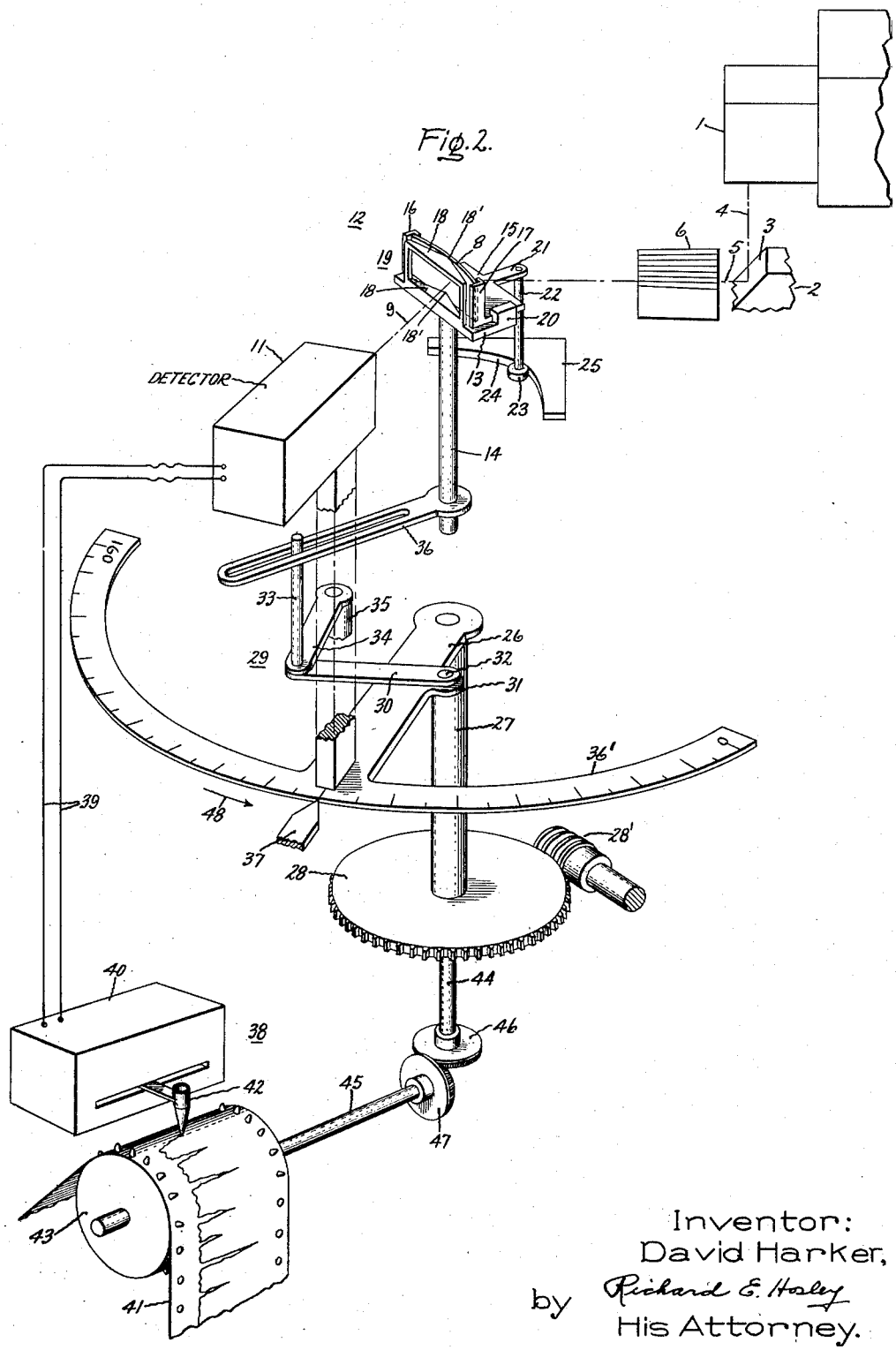

Patented Feb. 6, 1951

2,540,821

UNITED STATES PATENT OFFICE 2,540,821

X-RAY SPECTROMETER

David Harker, Schenectady, N. Y., assignor to General Electric Company, a corporation of New York Application April 19, 1949, Serial No. 88,461

15 Claims. (Cl. 250—52)

1

This invention relates generally to analysis by the use of X-rays.

In the study of materials and their properties, it is well known that a given material may be irradiated by primary rays or charged particles such that it will emit a fluorescent radiation. This fluorescent radiation is characteristic of the atomic composition of the material in that it is composed of X-rays having certain wavelengths and intensity ratios which are always the same for a given material irradiated by a given source. A plot of intensity versus wavelength of fluorescent X-rays is commonly known as the "fluorescent X-ray spectrum" of the material and may be used advantageously as a means for identifying or analyzing the material.

A principal problem in utilizing the above-described properties of X-rays lies in the difficulty of obtaining fluorescent radiations of sufficient intensity to permit facile detection. Much of the intensity of the irradiating or primary beam is expended in the phenomena of "scattering" and, even though a relatively intense primary beam is employed, the fluorescent radiation does not attain an intensity which is readily observed. Furthermore, since the intensities of the component wave-lengths must be individually measured to obtain a fluorescent X-ray spectrum, additional intensity depleting factors may be introduced by the means adopted for separating the spectrum into its components.

It has been suggested heretofore that the apparent intensity of the fluorescent X-rays may be increased by diffraction with a bent crystal. By this expedient X-rays may be monochromatized, i. e. those of a given single wave-length "separated" from the heterogeneous fluorescent radiation, and, at the same time, may be "focused" at a relatively defined spot. A detector may then be located at this spot to secure the advantage of the increased intensity.

In order to observe the X-ray spectrum of a material, however, it is necessary to measure separately each X-ray wave-length within the fluorescent radiation. The particular wavelength which is focused and detected at one time depends upon the relative positions of the material under study and the detector, as well as the position and curvature of the bent crystal. Heretofore, the spectrum has been obtained by employing a crystal having a fixed curvature and moving the crystal and the detector with respect to the material and to each other such that the requisite focusing relations are maintained for each of the wave-lengths to be measured. This necessarily results in the detector approaching the crystal as the spectrum is traversed, with the consequences that the focusing becomes less effective and scattered primary radiation gives spurious signals to the detector. Accordingly, it is a principal object of this invention to provide an improved, mechanically advantageous bent crystal X-ray spectrometer which is capable of realizing a high degree of resolution with minimum indication of scattered primary radiation.

In the attainment of the foregoing object an important feature of this invention resides in the provision of a flexible crystal having a variable curvature. By such an expedient the fluorescent spectrum of a specimen is obtained with the detector moving to traverse the spectrum at substantially a constant distance from the central axis of the flexible crystal.

The aspects of the invention which it is desired to protect herein are pointed out with particularity in the appended claims. The invention itself, together with further objects and advantages, may best be understood by references to the following description taken in connection with the drawings in which Fig. 1 is a diagrammatic representation useful in explaining the principle of the invention, Fig. 2 is a partially exploded, diagrammatic view suitably embodying the invention and Figs. 3 and 4 are diagrammatic illustrations illustrating operational characteristics of the invention.

To obtain a better understanding of the principles and features of the invention reference may be had to Fig. 1 wherein a specimen S may be considered as being irradiated by a source of polychromatic, hard X-rays such that its characteristic fluorescent X-ray spectrum will be emitted. Some of the rays in this spectrum may be represented as indicated by lines $A_1$, $A_2$, and $A_3$ and will pass through a thin crystal M.

According to theoretical concepts, X-rays are diffracted by a crystal in such a way that they may be considered to be "reflected" from planes of atoms existing in the crystal. Such planes of atoms are often called "lattice planes." The relation according to which this diffraction occurs—the so-called "Bragg law"—is most conveniently formulated in terms of this conceptual "reflection." In these terms the Bragg law is:

$$n\lambda = 2d \sin \theta \qquad (1)$$

where $d$ is the distance between lattice planes, $\theta$ is the angle of incidence or emergence of the X-rays, $\lambda$ is the wavelength of the X-rays and $n$ is a whole number called the order.

From this relation it may be seen that if crystal M has a certain interplanar spacing $d$ and is placed to intersect $P_1$ in the path of the fluorescent rays emanating from S such that a sheaf of its lattice planes perpendicular to the plane of the drawing form an angle $\theta$ with respect to the central incident ray $A_2$ of wavelength $\lambda$, incident ray $A_2$ will be diffracted as shown, to intersect circle $C_1$ at point $x$ along a path forming an angle $2\theta$ with the direction of the undiffracted ray $A_2$. It may also be shown that if crystal M has a radius of curvature of $R_3$, rays such as $A_1$ and $A_3$ of wavelength $\lambda$ which tend to converge at point $y$ on circle $C_1$ will also be diffracted to intersect circle $C_1$ at point $x$ even though they would have formed incident angles other than $\theta$ with crystal M had it remained flat. Thus, it may be seen that rays in the fluorescent spectrum of S having a single wavelength $\lambda$ may be "focussed" at point $x$ on circle $C_1$ which has its center at $P_1$. A detector D of X-rays having a relatively narrow entrance aperture may then be located at point $x$ to receive the rays. In practical use, if the interplanar spacing $d$ of crystal M is known and the position of detector D is measured, the wavelength $\lambda$ may be caluculated.

After the rays of wavelength $\lambda$ have been measured, rays within the fluorescent X-ray spectrum S having other frequencies or wavelengths may be measured by suitably altering the spatial interrelationship of the crystal M and detector D. It may be shown that if the radius of curvature of crystal M is left fixed while the crystal is rotated about an axis through $P_1$, the various wavelengths within the fluorescent spectrum of S will be focussed successively at points spatially distributed along the circumference of circle $C_2$ which has a radius of $R_2$ and a center at point $P_2$. The circumference of $C_2$ is also tangent to crystal M at $P_1$. It will be apparent, then, that if detector D is moved along $C_2$ at such a rate that the line $P_1x$ rotates at twice the angular speed with which crystal M is rotated, each wavelength within the fluorescent spectrum of S may be detected individually and successively. Thus, from the intensity measurements at the various angular positions of D, the X-ray spectrum of S may be obtained.

As has been heretofore mentioned, however, this arrangement has certain disadvantages resulting from the necessity of moving detector D along $C_2$ to receive the focussed rays. According to the present invention, the radius of curvature of crystal M is made variable to permit detector D to be moved along a circle $C_1$ of radius $R_1$ to receive the focussed rays rather than along circle $C_2$, thus maintaining a constant distance between detector D and the axis of rotation of crystal M.

From the diagram of Fig. 1 it may be shown that if the radius of curvature $R_3$ of the crystal M is bent according to the relation $$R_3 = \frac{R_1}{\cos \theta} \qquad (2)$$

then the locus of the foci is on circle $C_1$. This can be accomplished by a suitable structure having movable contact members F and G, each spaced from axis $P_1$ by a distance L, which are moved according to the law:

$$\delta = \frac{L^2 \cos \theta}{2R_1} \qquad (3)$$

where $\delta$ is the perpendicular distance between the tangent to the crystal at axis $P_1$ and a line parallel to the tangent intersecting the crystal contact points of members F and G. From this relation it is apparent that by maintaining L a constant and suitably varying $\delta$, the desired focussing of the various X-rays may be secured by placing detector D on $C_1$. Also, if L and $R_1$ are constants, $\delta$ becomes a function of $\theta$, thereby permitting the proper bending of crystal M to be directly determined by the position of the crystal as it is rotated. Thus, it may be observed that as the angle $\theta$ is varied, by rotating crystal M, to obtain the fluorescent X-ray spectrum of S, the desired focussing relations may be maintained even though detector D is moved along circle $C_1$.

In Fig. 2 there is shown an exemplary illustration of apparatus suitably adapted to the realization of the above described principles and features. A source 1, which may be a generator of hard, polychromatic X-rays, is positioned to irradiate a specimen 2 which has a substantially flat exterior face portion 3 placed at a suitable angle, such as 45°, with respect to the incident rays from source 1 represented by broken line 4. As has been heretofore explained, the irradiation of specimen 2 will excite fluorescent X-rays characteristic of its atomic composition. Some of such fluorescent X-rays will be emitted approximately perpendicular to the incident rays 4 as indicated by broken line 5 and will pass through a baffle 6 which serves to exclude stray radiation. Baffle 6 may comprise a plurality of blades of metal foil separated by tapering gaps of appropriate thickness and secured together in an integrated structure having the shape of a truncated cone. After the desired X-rays emerge from baffle 6, those having a particular wavelength will be diffracted and focussed by crystal 8, as indicated by broken line 9. To measure the intensity of the diffracted rays, a suitable detector 11, such as a Geiger counter, an ionization chamber, or a photoelectric multiplier device, is movably arranged with its entrance slit (not shown) traversing path 9 in a manner to be more fully described hereinafter.

For the purpose of rotating and varying the curvature of crystal 8, which may consist of a thin, rectangular cut of crystalline material such as mica or quartz, there is provided a crystal holder 12 which comprises a generally rectangular base plate 13 rigidly attached to a rotatable axle 14. Crystal 8 is supported on a slidable plate 15 between two upright right angle contact members 16 and 17 which may be formed integrally with plate 15. The center portion of crystal 8 bears against the apices 18', which lie on the axis of axle 14, of triangularly shaped members 18 that are attached to or integral with a hollow, box-shaped member 19 which is more clearly illustrated in Fig. 3. Members 18 and 19 may be securely fastened to base plate 13 by means of screws 19'. Right angle bearing members 20, one of which is not shown, serve to hold slidable plate 15 against the upper surface of base plate 13 while permitting transverse movement. Depending from a protruding lip portion 21 of slidable plate 15 is an axle 22, to the lower end of which is attached a roller 23 that bears against the face 24 of a stationary cam 25. As will now appear, when axle 14 is turned about its fixed longitudinal axis, crystal holder 12 will turn in synchronism therewith while the ends of crystal 8 will move back and forth with respect to base plate 13 in response to the position of slidable plate 15 which is determined by the cam 25. Thus, since the center portion of crystal 8 is maintained at a fixed position with respect to base plate 13 by means of triangular shaped members 18, crystal 8 may be considered as conforming approximately to the shape of an arc of a circle having a continuously variable curvature as axle 14 is rotated. In order to satisfy the conditions of Equation 3, cam 25 must be suitably positioned in a manner to be more fully described hereinafter.

To provide a means for rotating detector 11 in synchronism with crystal holder 12 such that the X-ray spectrum of specimen 2 may be suitably scanned, there is shown a radius arm 26 affixed to an axle 27 which is adapted to be driven in conventional fashion such as by toothed plate 28 and engaging worm gear 28'. The longitudinal axis of axle 27 is collinear with the longitudinal axis of axle 14 and dectector 11 is mounted upon radius arm 26 such that its entrance slit 11' will be upon an imaginary circle having a center on the axis of axle 14 as shown in Fig. 4. Axle 14 is driven at half the angular speed of axle 27 by the motion translating means indicated generally by numeral 29. As shown, means 29 comprises an arm 30 which is rotatably attached at one end to a protruding lip 31 of radius arm 26 by means of a rivet or bolt 32. Rotatably secured at the other end of arm 30 by means of an upright post 33 is one end of an arm 34, the remaining end of which is rotatably attached to fixed support 35. Upright post 33 is slidably positioned within the slotted portion of an arm 36 which is rigidly fixed to rotatable axle 14. This exemplary motion translating means will serve to rotate axle 14 at half the speed of axle 27 as worm 28' is rotated, providing the lengths of arms 30 and 34 are equal, and the distances from the axis of axle 27 to the axes of post 35 and bolt 32 are equal. In such event, arm 36 will always bisect opposite angles of the imaginary quadrilateral, thereby assuring the desired relationship.

Indication of the angular position of detector 11 and crystal holder 12 may be obtained by means of a calibrated scale 36', formed integrally with radius arm 26, and a fixed pointer 37. Scale 36' has a shape conforming to the arc of a circle concentric with the circular path followed by the entrance slit 11' of detector 11 as worm 28' is turned to obtain the spectrum of specimen 2.

In order to obtain a permanent record of the spectrum of specimen 2, there is provided a recorder 38 of a conventional type having its input connected to the output of detector 11 by means of leads 39. Signals from detector 11, generated by X-rays from specimen 2, are transmitted to the recorder element 40 and recorded as intensities of X-radiation upon chart 41 by means of pen 42. The trace recorded by pen 42 may be made a function of the position of detector 11 and crystal 8 by moving the chart with a conventional toothed drum 43 which is driven through axles 44 and 45 and meshed bevel gears 46 and 47 as screw 28' is turned.

Reference may now be had to Fig. 4 wherein portions corresponding to elements of Fig. 2 and the diagram of Fig. 1 are similarly identified. As shown, the apparatus may be considered to be in a position to measure the intensity of rays having a given wavelength $\lambda$ in the fluorescent X-ray spectrum of specimen 2. Crystal 8 is supported in crystal holder 12 such that its central transverse axis forms an incident angle $\theta$ with respect to central ray path 5 ($A_2$ in Fig. 1) while entrance slit 11' of detector 11 (D in Fig. 1) is positioned to admit the diffracted rays 9 at an angle $2\theta$. Thus, providing the interplanar spacings $d$ of crystal 8 (M in Fig. 1) are of the proper value, Equation 1 will be satisfied for rays having a wavelength $\lambda$ and detector 11 will indicate their intensity if they follow paths 5 and 9. In addition, rays of wavelength $\lambda$ emanating from specimen 2 which have incident angles other than $\theta$ will be diffracted and focussed at point $x$ coincident with entrance slit 11', providing the curvature $R_3$ of crystal 8 is such as to satisfy Equation 2. This requirement may be fulfilled by suitable location of stationary cam 25 as will appear subsequently.

As screw 28' (Fig. 2) is turned, crystal holder 12 will rotate on axle 14 and detector 11 will move upon radius arm 26. Detector 11 will follow the circular path or focussing circle $C_1$ and its relationship with the rotation of crystal 8 in holder 12 will always be such as to satisfy Equation 1 for various values of $\theta$, since detector 11 moves in synchronism with and at twice the angular speed of axle 14. Moreover, as holder 12 rotates on axle 14, roller 23 will move synchronously therewith along face 24 of stationary cam 25, thereby causing slidable plate 15 to move transversely in response thereto within bearing members 20. Accordingly, crystal 8 will be bent to present a convex surface to the incident fluorescent radiation about apices 18', which are coincident with the axis of axle 14, by means of contact members 16 and 17 that are attached to slidable plate 15. It may be shown from Equation 3 that the proper deflection $\delta$ of the contact members 16 and 17, as measured from their position when crystal 8 is permitted to lie flat or in the position of maximum radius of curvature, may be secured if the face 24 of stationary cam 25 conforms to the arc of a circle of a convenient radius whose center is a distance $L^2/2R_2$ from the axis of axle 14 ($P_1$ in Fig. 1) along a line joining the axis of axle 14 and point $y$. L represents the distance of each contact member 16 and 17 from the axis of axle 14 while $R_1$ is the radius of focussing circle $C_1$, the path followed by detector 11. In this manner, the proper focussing relationships may be maintained as screw 28' is rotated.

In the operation of the invention, screw 28' is turned to move the radius arm 26 and detector 11 through the range from $2\theta=0°$ (see Fig. 5), at which maximum curvature of crystal 8 occurs, toward $2\theta=180°$ as indicated by arrow 48 adjacent calibrated scale 36' (Fig. 2). For practical purposes, $2\theta$ usually need not exceed 160° which is the maximum value shown on scale 36'. A given wavelength within the fluorescent spectrum of specimen 2 will be indicated as a peak on chart 41 whenever the incident angle $\theta$ satisfies Equation 1 for successive integer values of $n$, e. g. when $$\sin \theta = \lambda/2d, \ 2\lambda/2d, \ 3\lambda/2d, \text{ etc.}$$

Another given wavelength will be indicated at a correspondingly different series of values for $\theta$. Thus, the complete fluorescent spectrum of a specimen may be obtained.

As an illustration of a practical adaptation of this invention specimen 2 may be considered as consisting of pure copper having a characteristic spectrum comprising wavelengths:

$$K\beta = 1.3894 k\overline{X}, \ K\alpha_1 = 1.5374 k\overline{X}$$

and $$K\alpha_2 = 1.5412 k\overline{X}$$

(The symbol $k\overline{X}$ represents kilo-X-units of wavelength. Lengths in kilo-X-units may be transformed into lengths in centimeters by multiplying by $1.00202 \times 10^{-8}$). If flexible crystal 8 consists of mica having a sheaf of lattice planes perdicular to its cleavage with spacings $d_{020}=4.51kX$, then peaks will be indicated on chart 41 at values of $2\theta$ varying from approximately $2\theta=17°\ 41'$, for $n=1$ with wavelength $K\beta$, to $2\theta=117°\ 22'$, for $n=5$ with wavelength $K\alpha_2$. Since each element has a different characteristic spectrum containing component wavelengths of this nature, specimen 2 may consist of an unknown material which can be analyzed for the elements it contains, qualitatively from the values of $2\theta$ (or wavelengths) at which peaks occur and quantitatively from the intensities indicated by the heights of the peaks.

Although the description has been concerned mainly with one embodiment of the motion translating means 29, it is obvious that other means, such as gears, may be equivalently employed, providing backlash tolerances necessary for the desired accuracy are not exceeded. Moreover, since similar motion translating means, as well as similar X-ray detecting and recording means, may be utilized in X-ray diffraction goniometer apparatus, it will be apparent that the instant invention will find useful application in providing conjunctive analytical apparatus.

It will also be observed that the specimen 2, illustrated in Fig. 2, may be any material in solid, liquid or gaseous form and need not be located at any particular angle with respect to the incident rays from source 1, providing the excited fluorescent radiation may be viewed by crystal 8. In some instances it may be desirable to insert "soller" slits in the path of the fluorescent radiation immediately before and after its passage through crystal 8 in order to improve the fineness of focussing. Furthermore, it will be noted that the source 1 need not be restricted to a source of hard X-rays. Any means of exciting the fluorescent X-ray spectrum of a specimen being analyzed may be employed with efficacy; e. g. bombardment with electrons or other charged particles having a suitable energy. Since some radio-active materials excite their own fluorescent X-ray spectra, no external excitation is necessary when specimens of such materials are being analyzed.

It will be understood, therefore, that while the invention has been described by reference to particular embodiments thereof, numerous changes may be made without actually departing from the invention, and in the appended claims it is intended to cover such equivalent variations of application and structure as are within the true spirit and scope of the foregoing disclosure.

What I claim as new and desire to secure by Letters Patent of the United States is:

1. The method of obtaining a fluorescent X-ray spectrum of a material which comprises irradiating a specimen to excite its fluorescent radiation, successively diffracting the component wavelengths of said radiation along paths intersecting a focussing circle by rotating a flexible crystal within said radiation about an axis coincident with the center of said circle, bending said crystal in relation to the rotation thereof to focus said component wavelengths on said focussing circle, and moving a detector along said focussing circle in relation to the rotation of said crystal to receive said focussed component wavelengths.

2. The method of measuring the component wavelengths within the characteristic fluorescent X-ray spectrum of a material which comprises irradiating a specimen to excite its fluorescent radiation, positioning a flexible crystal within the path of said radiation to diffract said radiation, rotating and simultaneously bending said crystal about a fixed axis to focus said diffracted radiation at spatially distributed points corresponding to respective wavelengths along a focussing circle having its center on said axis, and moving a detector along said focussing circle in synchronism with the rotation of said crystal to receive the diffracted radiation.

3. The method of measuring the component wavelengths within the characteristic fluorescent X-ray spectrum of a material which comprises positioning a flexible crystal in the path of the fluorescent radiation to diffract said radiation, rotating and bending said crystal about a fixed axis to monochromatize and focus successively the component wavelengths of said radiation at spatially distributed points along a focussing circle having its center on said axis, and moving a detector along said focusing circle in relation to the rotation of said crystal to receive said focussed component wavelengths.

4. The method of measuring the component wavelengths within the characteristic fluorescent X-ray spectrum of a material which comprises rotating a flexible crystal within the path of the fluorescent radiation to monochromatize successively the component wavelengths of said radiation as a function of the angular position of said crystal with respect to central incident radiation, variably bending said crystal about its axis of rotation in conjunction with its rotation to focus successively said components along a focussing circle having its center on said axis, and moving a detector along said focussing circle in relation to the rotation of said crystal to receive said focussed components.

5. In a method of measuring the component wavelengths within the characteristic X-ray spectrum of a material by rotating a crystal within the fluorescent radiation to monochromatize successively the various components along spatially distributed paths intersecting a focussing circle, the improvement which comprises bending said crystal about its axis of rotation in synchronism therewith whereby said components may be focussed successively along a focussing circle having its center on the axis of rotation of said crystal.

6. In apparatus for measuring the component wavelengths of radiation within the fluorescent X-ray spectrum of a material, a flexible crystal mounted rotatably about an axis in the path of the fluorescent X-radiation to diffract component wavelengths selectively as a function of its angular position, means for detecting the diffracted radiation mounted movably as a function of the angular position of said crystal along a circular path having an axis collinear with the axis of rotation of said crystal, and means for bending said crystal to conform to the arc of a circle intersecting the axis of rotation of said crystal and having a radius of curvature variable as a function of the angular position of said crystal.

7. In apparatus for measuring the component wavelengths of radiation within the fluorescent X-ray spectrum of a material, a flexible crystal mounted rotatably about an axis in the path of the fluorescent X-radiation to diffract component wavelengths selectively as a function of its angular position, means for detecting the diffracted radiation mounted movably along a circular path having an axis collinear with the axis of rotation of said crystal, motion translating means for rotating said crystal and moving said detecting means in synchronism, and means for bending said crystal to conform to the arc of a circle intersecting the axis of rotation of said crystal and having a radius of curvature variable as a function of the angular position of said crystal.

8. In apparatus for measuring the component wavelengths of radiation within the fluorescent X-ray spectrum of a material, a flexible crystal mounted movably about an axis in the path of the fluorescent X-radiation to monochromatize the component wavelengths along spatially distributed paths intersecting a focussing circle which has its center on said axis, means movable along said focussing circle in synchronism with the rotation of said crystal for detecting said component wavelengths, and means for bending said crystal to conform to the arc of a circle intersecting the axis of rotation of said crystal and having a radius of curvature variable in synchronism with the rotation of said crystal whereby each of said component wavelengths of radiation may be focussed successively along said focussing circle for detection.

9. In apparatus for measuring the component wavelengths of radiation within the fluorescent X-ray spectrum of a material, a flexible crystal supported rotatably about an axis substantially parallel to a sheaf of its lattice planes in the path of the fluorescent X-radiation to monochromatize the component wavelengths along spatially distributed paths intersecting a focussing circle which has its center on said axis, means movable along said focussing circle in synchronism with the rotation of said crystal for detecting said component wavelengths, and cam operated means for bending said crystal to conform to the arc of a circle intersecting the axis of rotation of said crystal and having a radius of curvature variable in synchronism with the rotation of said crystal whereby each of the component wavelengths may be focussed successively along said focussing circle for detection.

10. In apparatus for measuring the component wavelengths of radiation within the fluorescent X-ray spectrum of a material, a flexible crystal supported rotatably about an axis substantially parallel to a sheaf of its lattice planes in the path of the fluorescent X-radiation to monochromatize the component wavelengths along spatially distributed paths intersecting a focussing circle which has its center on said axis, cam operated means for bending said crystal about its aforementioned axis to conform to the shape of the arc of a circle, detecting means movable along said focussing circle for receiving said component wavelengths, and motion translating means for rotating said crystal, moving said detecting means and actuating said cam operated means in synchronism whereby each of the component wavelengths may be focussed successively along said focussing circle for detection.

11. In apparatus for measuring the component wavelengths of radiation within the fluorescent X-ray spectrum of a material, a flexible crystal having a central portion and end portions, said crystal being rotatably supported about an axis traversing said central portion and in the path of the radiation to monochromatize the component wavelengths along spatially distributed paths intersecting a focussing circle; movable contact members bearing against the end portions of said crystal for bending said crystal about said axis to present a generally convex surface to said radiation; detecting means movable along said focussing circle for receiving said component wavelengths; and motion translating means for rotating said crystal, moving said contact members and moving said detecting means whereby each of the component wavelengths may be focussed successively along said focussing circle for detection.

12. In apparatus for measuring the component wavelengths of radiation within the fluorescent X-ray spectrum of a material; a flexible crystal in the path of the radiation; a holder for said crystal comprising fixed apices bearing against a central portion of said crystal and movable contact members bearing against end portions of said crystal for bending said crystal about said apices to present a generally convex surface of variable curvature to the radiation, said holder being rotatably mounted about an axis substantially coincident with said apices whereby said crystal may be rotated to monochromatize the component wavelengths along spatially distributed paths intersecting a focussing circle; detecting means movable along said focussing circle for receiving the component wavelengths; and motion translating means for rotating said holder and crystal, moving said contact members and moving said detecting means in synchronism whereby each of the component wavelengths may be focussed successively along said focussing circle for detection.

13. An attachment for use with X-ray diffraction goniometer apparatus to obtain the fluorescent X-ray spectrum of a material comprising a rotatably mountable crystal holder including fixed apices coincident with the axis of rotation of said holder and spaced movable contact members between which a flexible crystal may be supported to bear at its center against said apices, and means attached to said movable contact members adapted to bear against a stationary cam to move said contact members as said holder is rotated about its axis.

14. An attachment for use with X-ray diffraction goniometer apparatus to obtain the fluorescent X-ray spectrum of a material comprising a rotatably mountable crystal holder including fixed apices coincident with the axis of rotation of said holder and spaced simultaneously movable contact members between which a flexible crystal may be supported to bear at its center against said apices, the direction of movement of said contact members being substantially perpendicular to a plane including said apices and the contact portions of said contact members, and means attached to said movable contact members adapted to bear against a stationary cam to move said contact members as said holder is rotated about its axis.

15. An attachment for use with X-ray diffraction goniometer apparatus having a source of X rays, detecting means movable along a focussing circle, a rotatably mounted specimen holder, and motion translating means for rotating the specimen holder and moving said detecting means in synchronism; said attachment comprising a crystal holder adapted to replace the specimen holder including fixed apices coincident with its axis of rotation and spaced movable contact members between which a flexible crystal may be supported to bear at its center against said apices, a stationary cam adapted to be positioned adjacent said crystal holder, and means attached to said movable contact members and adapted to bear against said stationary cam to move said contact members as said crystal holder is rotated.

DAVID HARKER.

REFERENCES CITED

The following references are of record in the file of this patent:

UNITED STATES PATENTS

| Number | Name | Date |
|---|---|---|
| 2,449,066 | Friedman | Sept. 14, 1948 |
| 2,452,045 | Friedman | Oct. 26, 1948 |
| 2,474,835 | Friedman | July 5, 1949 |

OTHER REFERENCES

"Philips Technical Review," vol. 10, No. 1, pp. 1–36, July 1948.

Focusing X-ray monochromators, by C. S. Smith, Review Scientific Instruments, June 1941, pp. 312–314.

Certificate of Correction

Patent No. 2,540,821                                    February 6, 1951

DAVID HARKER

It is hereby certified that error appears in the printed specification of the above numbered patent requiring correction as follows:

Column 6, line 35, for "distance $L^2/2R_2$" read *distance $L^2/2R_1$*;

and that the said Letters Patent should be read as corrected above, so that the same may conform to the record of the case in the Patent Office.

Signed and sealed this 19th day of June, A. D. 1951.

[SEAL]

THOMAS F. MURPHY,
*Assistant Commissioner of Patents.*